United States Patent
Lee et al.

(10) Patent No.: US 11,380,928 B2
(45) Date of Patent: Jul. 5, 2022

(54) SEALED REDOX BATTERY

(71) Applicant: Standard Energy Inc., Daejeon (KR)

(72) Inventors: Dongyoung Lee, Seoul (KR); Bugi Kim, Sejong (KR); Dongheun Kim, Daejeon (KR); Sanghyun Park, Sejong (KR); Kangyeong Choe, Daejeon (KR)

(73) Assignee: Standard Energy Inc., Daejeon (KR)

( * ) Notice: Subject to any disclaimer, the term of this patent is extended or adjusted under 35 U.S.C. 154(b) by 8 days.

(21) Appl. No.: 17/114,910

(22) Filed: Dec. 8, 2020

(65) Prior Publication Data

US 2021/0175532 A1 Jun. 10, 2021

Related U.S. Application Data

(60) Provisional application No. 62/945,729, filed on Dec. 9, 2019.

(51) Int. Cl.
*H01M 4/90* (2006.01)
*H01M 8/18* (2006.01)
(Continued)

(52) U.S. Cl.
CPC ........... *H01M 8/20* (2013.01); *H01M 4/9041* (2013.01); *H01M 4/94* (2013.01); *H01M 8/04208* (2013.01)

(58) Field of Classification Search
CPC ........ H01M 8/20; H01M 4/9041; H01M 4/94; H01M 8/04208
(Continued)

(56) References Cited

U.S. PATENT DOCUMENTS

| 6,761,945 B1 | 7/2004 | Adachi et al. |
| 7,320,844 B2 | 1/2008 | Skyllas-Kazacos |

(Continued)

FOREIGN PATENT DOCUMENTS

| CN | 108630960 A | 10/2018 |
| JP | 2016-536753 A | 11/2016 |

(Continued)

OTHER PUBLICATIONS

Alotto et al., "Redox Flow Batteries for the Storage of Renewable Energy: A Review", 15 pages, uploaded by Massimo Guarnieri on Nov. 25, 2017, DOI: 10.1016/j.rser.2013.08.001.
Chen et al., "Chapter 5—Redox Flow Batteries: Fundamentals and Applications", © 2017, pp. 103-118, http://dx.doi.org/10.5772/intechopen.68752.
Choi et al., "A review of vanadium electrolytes for vanadium redox flow batteries", Renewable and Sustainable Energy Reviews, vol. 69, pp. 263-274, 2017.
(Continued)

*Primary Examiner* — Christian Roldan
(74) *Attorney, Agent, or Firm* — Knobbe, Martens, Olson & Bear, LLP

(57) ABSTRACT

The disclosed technology generally relates to energy storage devices, and more particularly to redox batteries. In one aspect, a redox battery comprises a first half cell and a second half cell. The first half cell comprises a positive electrolyte reservoir comprising a first electrolyte contacting a positive electrode and has dissolved therein a first redox couple configured to undergo a first redox half reaction. The second half cell comprises a negative electrolyte reservoir comprising a second electrolyte contacting a negative electrode and has dissolved therein a second redox couple configured to undergo a second redox half reaction. The redox battery additionally comprises an ion exchange membrane separating the positive electrolyte reservoir and the negative electrolyte reservoir. The first half cell, the second half cell and the ion exchange membrane define a redox battery cell that is sealed in a casing.

26 Claims, 7 Drawing Sheets

(51) Int. Cl.
  *H01M 8/20* (2006.01)
  *H01M 8/04082* (2016.01)
  *H01M 4/94* (2006.01)

(58) Field of Classification Search
  USPC .................................................. 429/512
  See application file for complete search history.

(56) References Cited

U.S. PATENT DOCUMENTS

| | | | |
|---|---|---|---|
| 8,785,023 | B2 | 7/2014 | Horne et al. |
| 2005/0208369 | A1 | 9/2005 | Puhlick et al. |
| 2005/0244707 | A1 | 11/2005 | Skyllas-Kazacos et al. |
| 2008/0318098 | A1* | 12/2008 | Matsunaga ........ H01M 8/04089 429/415 |
| 2011/0223450 | A1 | 9/2011 | Horne et al. |
| 2013/0011704 | A1* | 1/2013 | Horne .................... B60L 50/64 429/72 |
| 2013/0059189 | A1* | 3/2013 | Benham .................. H01M 8/20 429/101 |
| 2014/0212773 | A1 | 7/2014 | Ito |
| 2014/0272483 | A1 | 9/2014 | Pham et al. |
| 2015/0280259 | A1 | 10/2015 | Anderson et al. |
| 2016/0006054 | A1* | 1/2016 | Li ........................ H01M 8/188 429/418 |
| 2016/0308234 | A1 | 10/2016 | Reece et al. |
| 2016/0315337 | A1 | 10/2016 | Perry et al. |
| 2018/0269514 | A1* | 9/2018 | Kim ..................... H01M 8/0693 |
| 2020/0006796 | A1* | 1/2020 | Su ........................... H01M 4/62 |

FOREIGN PATENT DOCUMENTS

| | | |
|---|---|---|
| WO | WO 2014/104282 A1 | 7/2014 |
| WO | WO 2018/201092 A1 | 11/2018 |
| WO | WO 2019/072385 A1 | 4/2019 |

OTHER PUBLICATIONS

Clausen et al., "Numerical Modeling of an All Vanadium Redox Flow Battery", Sandia National Laboratories, 46 pages, Sandia Report, SAND2014-0190, Unlimited Release, Printed Jan. 2014.

Cunha et al., "Vanadium Redox Flow Batteries: a Technology Review", 58 pages, uploaded by Francisco P. Brito on Oct. 17, 2017, DOI: 10.1002/er.3260.

Hopkins, B.J., "Mechanical Design of Flow Batteries", Massachusetts Institute of Technology, 73 pages, May 16, 2013.

Kim, S., "Chapter—Vanadium Redox Flow Batteries: Electrochemical Engineering", IntechOpen, Energy Storage Devices, 20 pages, DOI: http://dx.doi.org/10.5772/intechopen.85166, © 2019.

Lim et al., "Advances in membrane and stack design of redox flow batteries (RFBs) for medium- and large-scale energy storage", Advances in Batteries for Medium- and Large-scale Energy Storage, Nanyanq Technological University, Singapore, http://dx.doi.org/10.1016/B978-1-78242-013-2.000145-5, © 2015.

Nandanwar et al., "Pump-less, free-convection-driven redox flow batteries: Modelling, simulation, and experimental demonstration for the soluble lead redox flow battery", Journal of Power Sources, vol. 454, (2020), 227918.

Pan et al., "Review—Redox Species of Redox Flow Batteries: A Review", Molecules 2015, vol. 20, 20499-20517; doi:10.3390/molecules201119711, www.mdpi.com/journal/molecules.

Song et al., "Electrolyte transfer mechanism and optimization strategy for vanadium flow batteries adopting a Nafion membrane", Journal Power of Sources, https://doi.org/10.1016/j.powsour.2019.227503, © 2019 Elsevier B.V.

Uhrig et al., "Lithium-based vs. Vanadium Redox Flow Batteries—A Comparison for Home Storage Systems", Energy Procedia, vol. 99, pp. 35-43, 2016.

International Search Report and Written Opinion dated Mar. 10, 2021 in Application No. PCT/US2020/063558.

* cited by examiner 200B-1, 200B-2, ... 200B-n 200C-1, 200C-2, ... 200C-n 200D-1, 200D-2 ... 200D-n

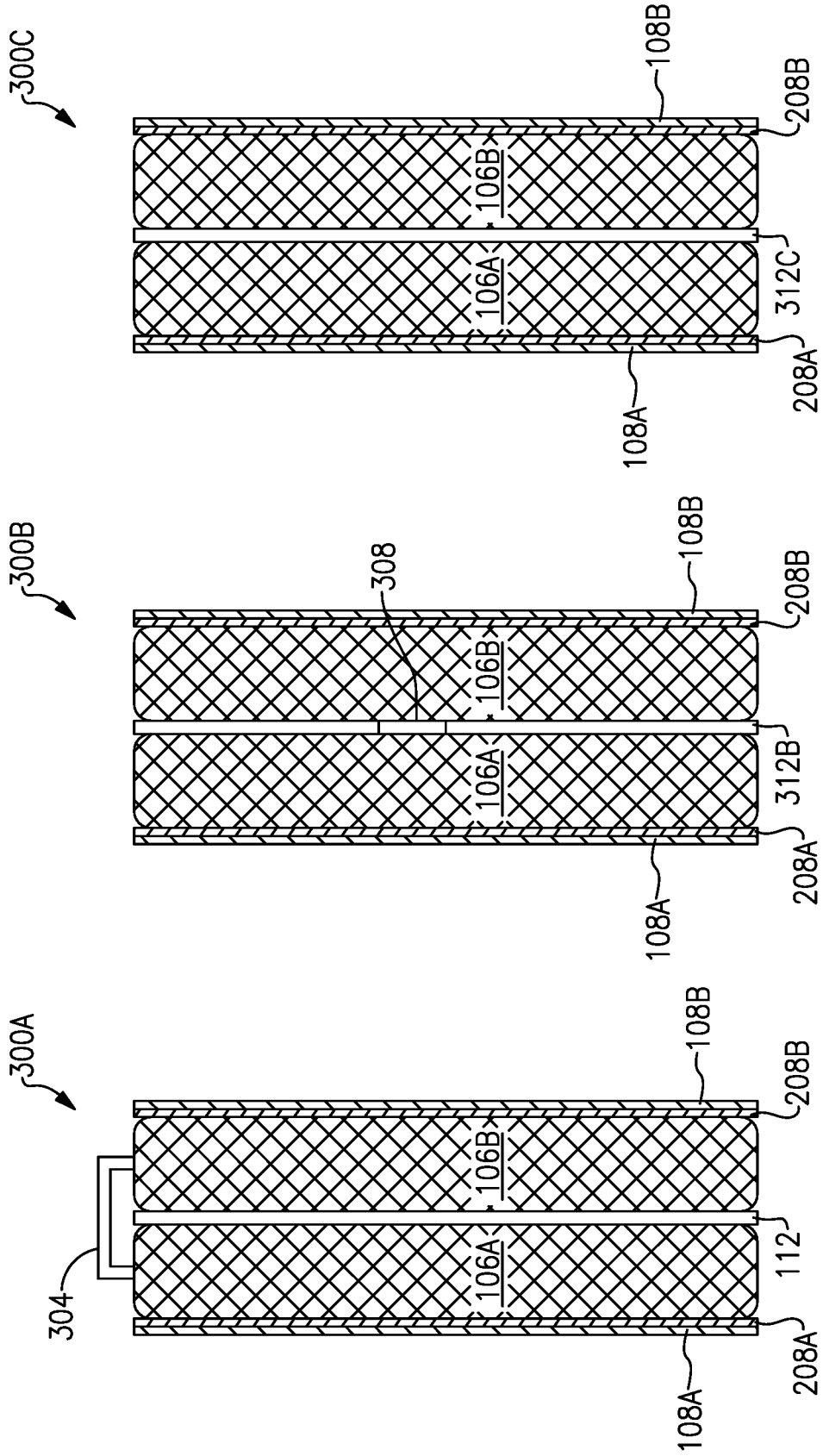

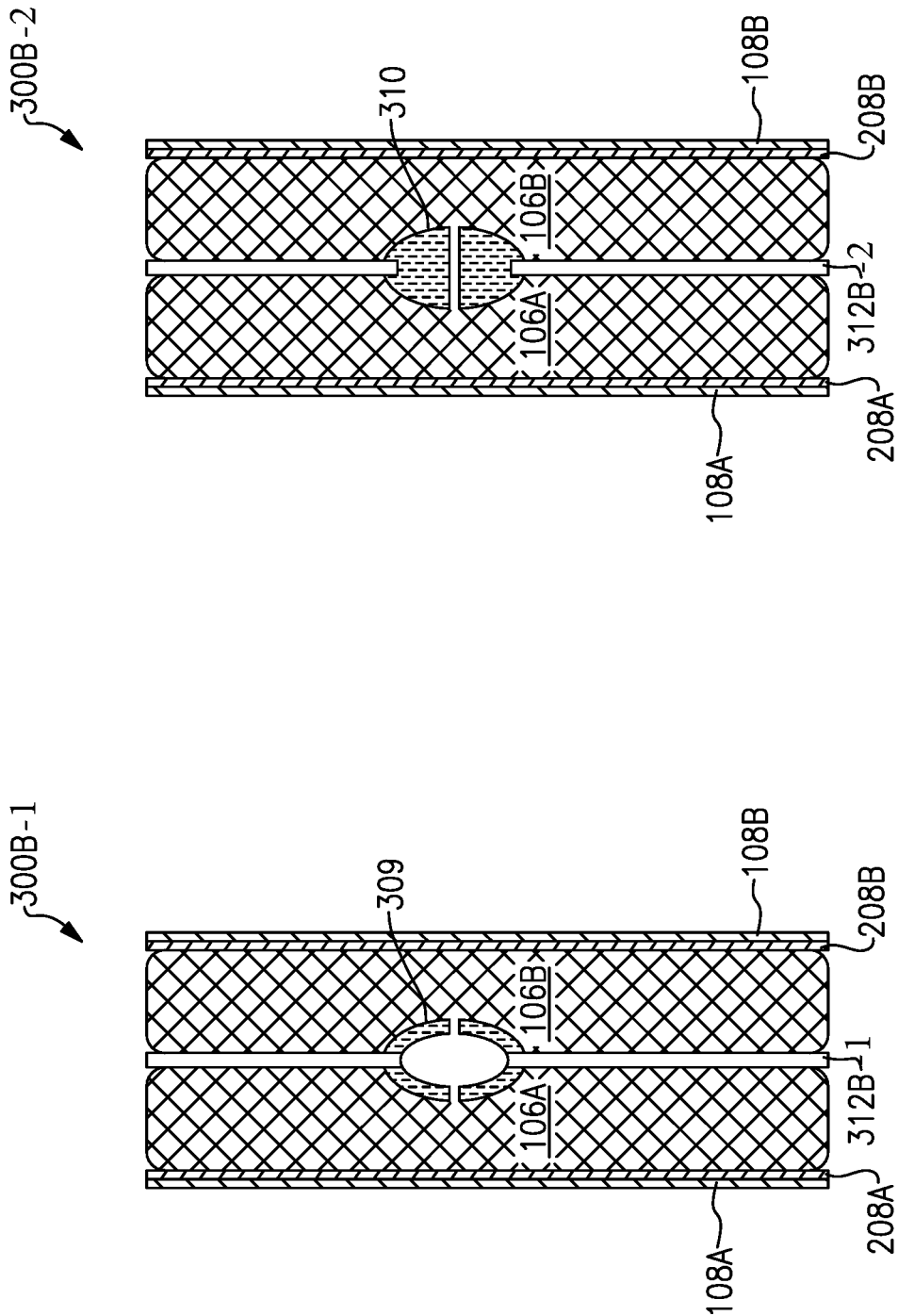

SEALED REDOX BATTERY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the priority benefit under 35 U.S.C. § 119(e) to U.S. Provisional Patent Application No. 62/945,729, filed Dec. 9, 2019, entitled "ENCLOSED MICROFLUIDIC REDOX BATTERY," the content of which is hereby expressly incorporated by reference in its entirety.

BACKGROUND

Field

The disclosed technology generally relates to energy storage devices, and more particularly to sealed redox batteries.

Description of the Related Art

The global economic growth accompanied by global warming continues increase the urgency of a need for renewable and sustainable energy systems based on renewable energy, e.g., solar and wind energy. To enhance the stability of grid networks against fluctuations due to intermittent availability such forms of energy, advances in energy storage systems (ESS) are used for storing surplus electricity, which can be delivered to end customers or to power grids when needed. Among others, ESS based on electrochemical energy, e.g., rechargeable or secondary batteries, can provide cost effective and clean forms of energy storage solutions. Examples of electrochemical energy storage systems include lithium-ion, lead-acid, sodium-sulfur and redox-flow batteries. Different storage times are needed for different applications: short-term storage, medium-term storage and long-term storage. The different types of electrochemical energy storage systems have different physical and/or chemical properties. Factors that determine the suitability for a particular application of the electrochemical energy storage systems include investment cost, power, energy, lifetime, recyclability, efficiency, scalability and maintenance cost, to name a few. Competing factors are weighed in the selection and design of a suitable electrochemical storage system.

SUMMARY

In a first aspect, a redox battery comprises a first half cell and a second half cell. The first half cell comprises a positive electrolyte reservoir comprising a first electrolyte contacting a positive electrode and has dissolved therein a first redox couple configured to undergo a first redox half reaction. The second half cell comprises a negative electrolyte reservoir comprising a second electrolyte contacting a negative electrode and has dissolved therein a second redox couple configured to undergo a second redox half reaction. The redox battery additionally comprises an ion exchange membrane separating the positive electrolyte reservoir and the negative electrolyte reservoir. The first half cell, the second half cell and the ion exchange membrane define a redox battery cell that is sealed in a casing.

In a second aspect, a redox battery comprises a first half cell and a second half cell. The first half cell comprises a positive electrolyte reservoir comprising a first electrolyte contacting a positive electrode and has dissolved therein a first redox couple configured to undergo a first redox half reaction. The second half cell comprises a negative electrolyte reservoir comprising a second electrolyte contacting a negative electrode and has dissolved therein a second redox couple configured to undergo a second redox half reaction. The redox battery additionally comprises a pressure relieving means for reducing or at least partly preventing a pressure buildup in one or both of the positive electrolyte reservoir and the negative electrode reservoir during operation.

In a third aspect, a redox battery comprises a first half cell and a second half cell. The first half cell comprises a positive electrolyte reservoir comprising a first electrolyte contacting a positive electrode and has dissolved therein a first redox couple configured to undergo a first redox half reaction. The second half cell comprises a negative electrolyte reservoir comprising a second electrolyte contacting a negative electrode and has dissolved therein a second redox couple configured to undergo a second redox half reaction. The first electrolyte reservoir stores substantially the entire volume of the first electrolyte for the first half cell, and the second electrolyte reservoir stores substantially the entire volume of the second electrolyte for the second half cell.

In a fourth aspect, a redox battery comprises a first half cell and a second half cell. The first half cell comprises a positive electrolyte reservoir comprising a first electrolyte contacting a positive electrode and has dissolved therein a first redox couple configured to undergo a first redox half reaction. The second half cell comprises a negative electrolyte reservoir comprising a second electrolyte contacting a negative electrode and has dissolved therein a second redox couple configured to undergo a second redox half reaction. The redox battery is configured such that the first and second electrolytes self-circulate within respective ones of the first and second half cells.

In a fifth aspect, a redox battery comprises a positive electrolyte reservoir comprising a first redox couple dissolved in a first electrolyte and configured to undergo a first redox half reaction, and a negative electrolyte reservoir comprising a second redox couple dissolved in a second electrolyte and configured to undergo a second redox half reaction. The redox battery additionally comprises an ion exchange membrane separating the positive electrolyte reservoir and the negative electrolyte reservoir and is configured to substantially inhibit transfer of the first electrolyte or the second electrolyte thereacross. The positive electrolyte reservoir, the negative electrolyte reservoir and the ion exchange membrane are disposed in an enclosed or sealed cell.

In a sixth aspect, a redox battery comprises a positive electrolyte reservoir comprising a first redox couple dissolved in a first electrolyte and configured to undergo a first redox half reaction, and a negative electrolyte reservoir comprising a second redox couple dissolved in a second electrolyte and configured to undergo a second redox half reaction. The redox battery additionally comprises an ion exchange membrane separating the positive electrolyte reservoir and the negative electrolyte reservoir and is configured to substantially inhibit transfer of the first electrolyte or the second electrolyte thereacross. Neither of the positive electrolyte reservoir or the negative electrolyte reservoir is connected to a separate electrolyte tank.

In a seventh aspect, a redox battery comprises a positive electrolyte reservoir comprising a first redox couple dissolved in a first electrolyte and configured to undergo a first redox half reaction, and a negative electrolyte reservoir comprising a second redox couple dissolved in a second electrolyte and configured to undergo a second redox half reaction. The redox battery additionally comprises an ion exchange membrane separating the positive electrolyte reservoir and the negative electrolyte reservoir and configured to substantially inhibit transfer of the first electrolyte or the second electrolyte thereacross. The redox battery does not include a pumping device for flowing the first electrolyte or the second electrolyte.

In a eighth aspect, a redox battery comprises a positive electrolyte reservoir comprising a first redox couple dissolved in a first electrolyte and configured to undergo a first redox half reaction, and a negative electrolyte reservoir comprising a second redox couple dissolved in a second electrolyte and configured to undergo a second redox half reaction. The redox battery additionally comprises an ion exchange membrane separating the positive electrolyte reservoir and the negative electrolyte reservoir and configured to substantially inhibit transfer of the first electrolyte or the second electrolyte thereacross. The positive electrolyte reservoir further comprises a positive electrode that does not participate in the first redox half reaction and the negative electrolyte reservoir further comprises a negative electrode that does not participate in the second redox half reaction.

In a ninth aspect, a redox battery comprises a positive electrolyte reservoir comprising a first redox couple dissolved in a first electrolyte and configured to undergo a first redox half reaction, and a negative electrolyte reservoir comprising a second redox couple dissolved in a second electrolyte and configured to undergo a second redox half reaction. The first and second redox half reactions occur without substantial transfer of ions of the first redox couple or the second redox couple across an ion exchange membrane separating the positive electrolyte reservoir and the negative electrolyte reservoir. The positive electrolyte reservoir, the negative electrolyte reservoir and the separator are disposed in an enclosed or sealed cell.

In a tenth aspect, a redox battery comprises a positive electrolyte reservoir comprising a first redox couple dissolved in a first electrolyte and configured to undergo a first redox half reaction, and a negative electrolyte reservoir comprising a second redox couple dissolved in a second electrolyte and configured to undergo a second redox half reaction. The first and second redox half reactions occur without substantial transfer of ions of the first redox couple or the second redox couple across an ion exchange membrane separating the positive electrolyte reservoir and the negative electrolyte reservoir. Neither of the positive electrolyte reservoir or the negative electrolyte reservoir is connected to a separate electrolyte tank.

In an eleventh aspect, a redox battery comprises a positive electrolyte reservoir comprising a first redox couple dissolved in a first electrolyte and configured to undergo a first redox half reaction, and a negative electrolyte reservoir comprising a second redox couple dissolved in a second electrolyte and configured to undergo a second redox half reaction. The first and second redox half reactions occur without substantial transfer of ions of the first redox couple or the second redox couple across a separator separating the positive electrolyte reservoir and the negative electrolyte reservoir. The redox battery does not include a pumping device for flowing the first electrolyte to and from the positive electrolyte reservoir or for flowing the second electrolyte to and from the negative electrolyte reservoir.

In a twelfth aspect, a redox battery comprises a positive electrolyte reservoir comprising a first redox couple dissolved in a first electrolyte and configured to undergo a first redox half reaction, wherein the positive electrolyte reservoir further comprises a positive electrode that does not participate in the first redox half reaction. The redox battery additionally comprises a negative electrolyte reservoir comprising a second redox couple dissolved in a second electrolyte and configured to undergo a second redox half reaction, wherein the negative electrolyte reservoir further comprises a negative electrode that does not participate in the second redox half reaction. The first and second redox half reactions occur without substantial transfer of ions of the first redox couple or the second redox couple across an ion exchange membrane separating the positive electrolyte reservoir and the negative electrolyte reservoir.

BRIEF DESCRIPTION OF THE DRAWINGS

FIG. 3A schematically illustrates a sealed redox battery configured to reduce or at least partly prevent pressure buildup in one or both of a positive electrolyte reservoir and a negative electrode reservoir using a conduit connected therebetween, according to some embodiments.

FIGS. 3B, 3B-1 and 3B-2 schematically illustrate sealed redox batteries configured to reduce or at least partly prevent pressure buildup in one or both of a positive electrolyte reservoir and a negative electrode reservoir using an ion exchange membrane having one or more openings formed therethrough, according to some other embodiments.

FIG. 3C schematically illustrates a sealed redox battery configured to reduce or at least partly prevent pressure buildup in one or both of a positive electrolyte reservoir and a negative electrode reservoir using a porous ion exchange membrane, according to yet some other embodiments.

DETAILED DESCRIPTION

As discussed above, competing factors that are weighed in the selection and design of a suitable electrochemical energy storage system for a particular application includes investment cost, power, energy, lifetime, recyclability, efficiency, scalability and maintenance costs, among others. Among various electrochemical energy storage systems, redox flow batteries (RFBs) are considered to be promising for stationary energy storage. RFBs are electrochemical energy conversion devices, that exploit redox processes of redox species dissolved in a solution. The solution is stored in external tanks and introduced into the RFB cell when needed. Some of the advantageous features of the RFB technology are: independent scalability of power and energy, high depth of discharge (DOD), and reduced environmental impact. Such features allow for wide ranges of operational powers and discharge times, making RFBs desirable for storage of electricity generated from renewable sources.

Figure 1:
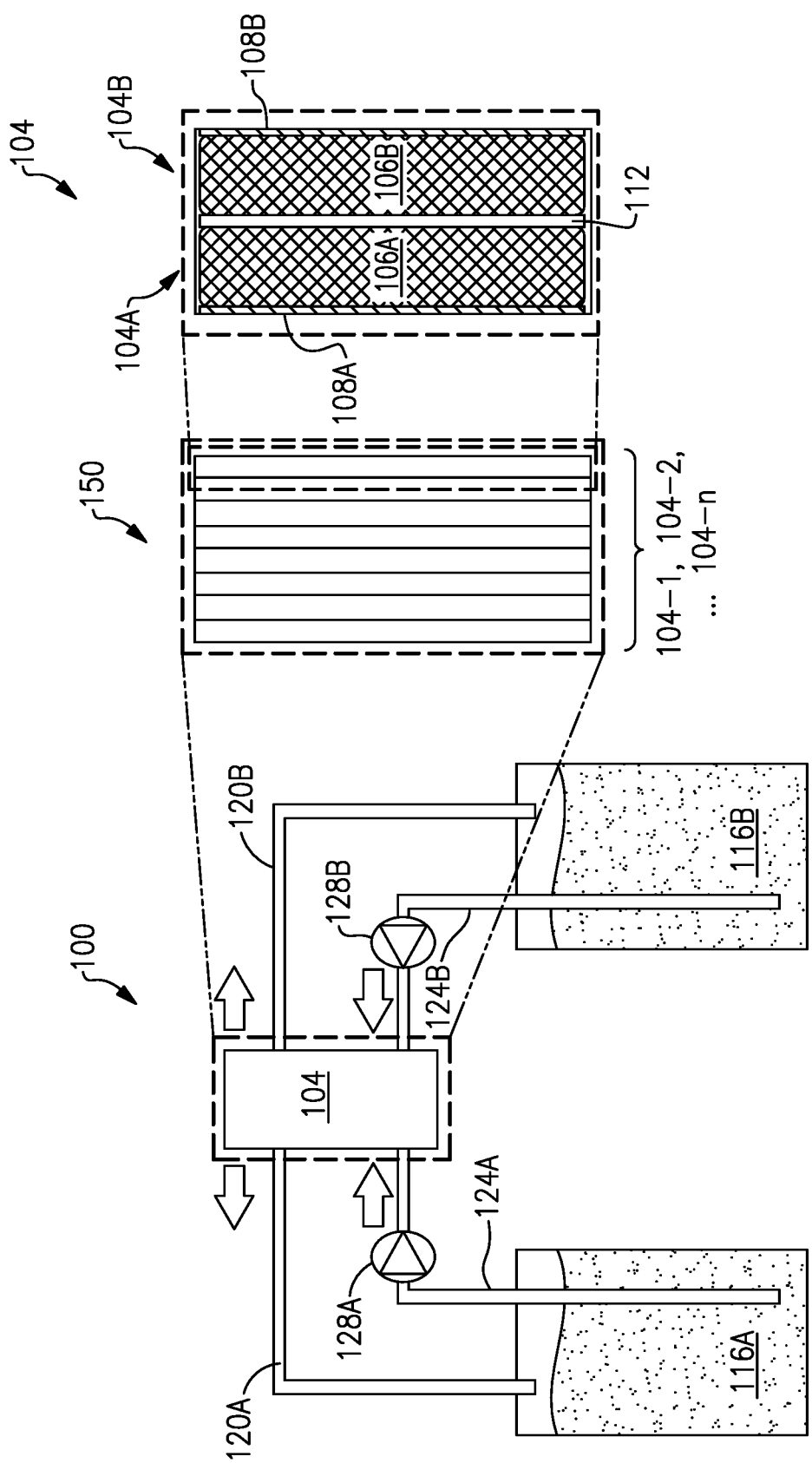
FIG. 1 is a schematic illustration of an example redox flow battery.

FIG. 1 is a schematic illustration of an example redox flow battery (RFB). The RFB 100 comprises a battery cell 104. The battery cell 104 has a first half cell 104A and a second half cell 104B separated by a separator or an ion exchange membrane 112. The first half cell 104A includes a positive electrolyte reservoir 106A having disposed therein a first or positive electrolyte and a positive electrode and the second half cell 104B includes a negative electrolyte reservoir 106B having disposed therein a second or negative electrolyte and a negative electrode. The positive electrode is electrically connected to a positive current collector 108A and the negative electrode is electrically connected to a negative current collector 108B. The positive electrolyte reservoir 106A is in fluidic communication and physically connected to a positive electrolyte tank 116A, and the negative electrolyte reservoir 106B is in fluidic communication and physically connected to a negative electrolyte tank 116B. In operation, the positive electrolyte is circulated between the positive electrolyte tank 116A and the positive electrolyte reservoir 106A via outlet and inlet conduits 120A, 124B, as shown by arrows using a positive electrolyte pump 128A. Similarly, the negative electrolyte is circulated between the negative electrolyte tank 116B and the negative electrolyte reservoir 106B via outlet and inlet conduits 120B, 124B.

In some configurations, a plurality of battery cells 104-1, 104-2, ..., 104-n are stacked for form a RFB cell 150, where each cell is configured in a similar manner as the battery cell 104. The plurality of battery cells 104-1, 104-2, ..., 104-n include respective ones of positive electrolyte reservoirs 106A, which may be in fluidic communication with each other, and respective ones of negative electrolyte reservoirs 106B, which may be in fluidic communication with each other. The connected ones of the positive electrolyte reservoirs 106A are in turn in fluidic communication with the positive electrolyte tank 116A, and the connected ones of the negative electrolyte reservoirs 106B are in turn are in turn in fluidic communication with the negative electrolyte tank 116B.

Compared to other electrochemical storage technologies such as lithium-ion, lead-acid and sodium-sulfur batteries, RFBs offer several advantages including separation of power conversion from energy storage, thus allowing for independent power and energy scaling. For example, RFBs can be adapted in a flexible and decentralized manner depending on the application, and be scaled to provide power and energy ranging from a few kW/kWh for e.g., domestic storage, up to systems of several to tens of MW/MWh for grid storage. In addition, unlike fuel cells, reactions in RFBs are reversible, thereby enabling the same cell to operate as converter of electricity into chemical energy and vice-versa. RFBs operate by changing the metal ion valence, without consuming ion metals, thereby allowing for long cycle service life. Cell temperature can be controlled relatively easily by regulating the electrolyte flow, in part due to the relatively high thermal mass of electrolytes. The state of charge (SOC) can be easily monitored through the cell voltage while very deep depth of discharge (DOD) can be achieved.

Despite various advantages of RFBs, their commercialization has not been widespread relative to other electrochemical storage technologies, despite relatively large capital, research and development investments that have been made in the technology through several decades. In particular, notwithstanding the recent surge in battery demand for ESS application and the apparent fitness of RFBs for such application including higher safety against fire and explosion, a widespread commercialization has yet to be realized, suggesting that there remain long felt need but substantial obstacles to commercialization of RFBs. The inventors have recognized several such obstacles, including relatively low reliability, low efficiency, large system footprint and high system complexity.

First obstacle to widespread commercialization of RFBs relates to relatively high complexity and the associated reliability issues of RFBs such as the RFB 100 described above with respect to FIG. 1. As described above, RFBs include multiple conduits 120A, 120B, 124A, 124B for transferring electrolytes to and from the battery cell 104, pumps 128A, 128B for circulating the electrolytes and tanks 116A, 116B for storing the electrolytes. Due to the relatively high complexity, various connection points associated with the conduits 120A, 120B, 124A, 124B between the battery cell 104 and the tanks 116A, 116B can lead to reliability failures, e.g., leakage. The likelihood and frequency of failures increases proportionally with the number of such conduits, which scales with the size of the ESS. When they occur, the failures lead to unscheduled repairs as well as safety hazard. In addition, reducing the likelihood of such failures and ensuring uninterrupted operation through preventive maintenance leads to added operating cost.

Second obstacle to widespread commercialization of RFBs relates to relatively low efficiency of RFBs. One cause of the relatively low efficiency relates to the energy expended in circulating the electrolytes. For example, the electrolyte for vanadium-based RFBs includes sulfuric acid, which can have relatively high viscosity. Circulating an electrolyte, especially an electrolyte having a relatively high viscosity, through fine porous structure of randomly oriented carbon fiber felt-based electrode can expend relatively high amounts of external energy, thereby lowering the extrinsic efficiency of the RFBs. The lower extrinsic efficiency of the RFB system is one of the main reasons for lower commercial competiveness relative to competing secondary battery technologies such as lithium ion battery (LIB) technology.

Third obstacle to widespread commercialization of RFBs relates to relatively lower power density and energy density compared to other electrochemical storage technologies, hindering their mobile applications. As described herein, power and energy densities refers to the power output and energy storage, respectively, of a storage device relative to the total volume of the energy storage device. Thus, for an RFB, the power and energy densities refer to ratios of power output and energy storage to the total volume including the cell volume, the tank volumes and the volumes of conduits for transferring the electrolytes. To partly compensate the lower power and energy densities, RFBs often have cell active areas and membranes that are relatively large, resulting in increased cell dimensions, which can in turn cause high transverse gradients of electrolytes inside the electrolyte reservoirs 116A, 116B. Consequently, the average current density and nominal current of RFBs can be substantially lower compared to the maximum theoretical values based on uniform maximum current density. In addition, the overall system-level space efficiency is further reduced by the need for a circulation system including separate tanks and conduits.

Fourth obstacle to widespread commercialization of RFBs relates to the system complexity, which can be comparable to that of a chemical plant. The complexity of designing the RFB systems is high, which in turn increases the development cycle, which in turn results in significantly slow technology development. In addition, the system complexity is labor- and capital-intensive and requires a high level of expertise in installation, maintenance and demolition at an ESS site. The system complexity deters consumers due to the potential need for increased staffing and training required to build and maintain the systems, as well as the accompanying increase in the overall cost.

To address these and other limitations while retaining most of the benefits conferred by the RFBs, the present disclosure is directed to sealed redox batteries.

Sealed Redox Battery

Various embodiments of a redox battery disclosed herein are directed to a redox battery. The redox battery according to embodiments retain the advantages of RFBs while at least partly overcoming or mitigating some of all of the commercialization obstacles of RFBs discussed above. In particular, while using redox couples that participate in redox reactions, unlike some RFBs, embodiments of a redox battery disclosed herein include a sealed battery cell and do not have a separate electrolyte tank connected to the battery cell, nor an electrolyte circulating device such as a pump for supplying the electrolyte from outside of the battery cell.

Figure 2A:
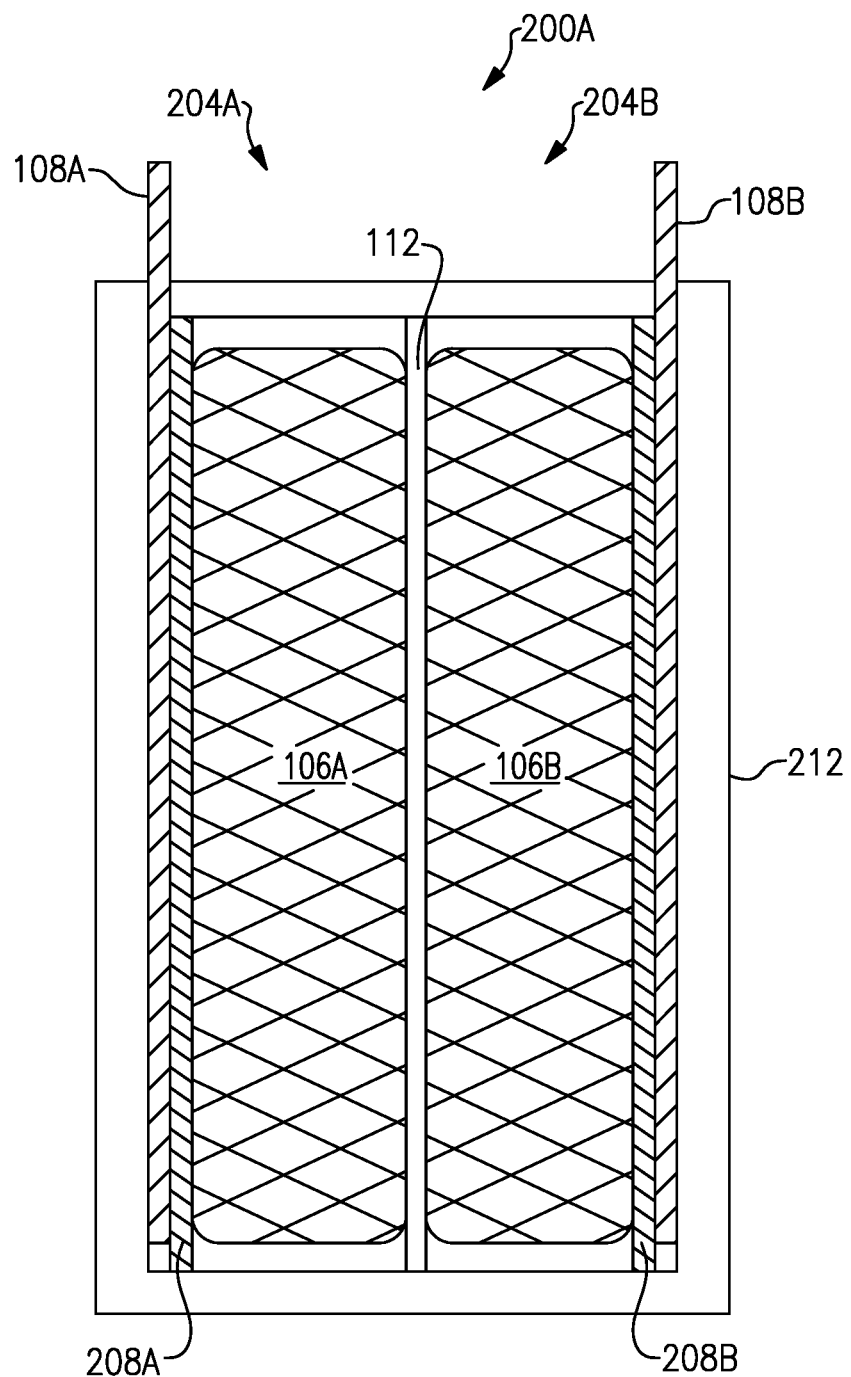
FIG. 2A is a schematic illustration of a sealed redox battery, according to embodiments.

FIG. 2A is a schematic illustration of a sealed redox battery, according to embodiments. The illustrated sealed redox battery 200A comprises a first half cell 204A and a second half cell 204B. The first half cell 204A comprises a positive electrolyte reservoir 106A having disposed therein a first or positive electrolyte contacting a positive electrode. The first electrolyte has dissolved therein a first redox couple configured to undergo a first redox half reaction. The second half cell 204B comprises a negative electrolyte reservoir 106B having disposed therein a second or negative electrolyte contacting a negative electrode. The second electrolyte has dissolved therein a second redox couple configured to undergo a second redox half reaction. The positive and negative electrolyte reservoirs 106A, 106B define reaction spaces for the respective half reactions. The sealed redox battery 200A additionally comprises an ion exchange membrane 112 separating the positive electrolyte reservoir 106A and the negative electrolyte reservoir 106B. The positive electrode is electrically connected to a positive current collector 108A and the negative electrode is electrically connected to a negative current collector 108B. In some implementations, a first bipolar plate 208A is interposed between the positive current collector 108A and the positive electrolyte reservoir 106A, and a second bipolar plate 208B is interposed between the negative current collector 108B and the negative electrolyte reservoir 106B.

Unlike conventional RFBs, in the sealed redox battery 200, the first half cell 204A, the second half cell 204B and the ion exchange membrane 112 define a redox battery cell that is sealed in a casing or a frame 212. The sealed casing 212 is such that under normal operation, internal contents thereof may not be physically accessible from the outside. That is, the positive and negative electrolytes are not in fluidic communication with external containers such as electrolyte tanks. The casing 212 may seal the redox battery 200A hermetically and/or permanently. Such configuration is in contrast to conventional redox flow batteries, in which the redox battery cell is in fluidic communication with external tanks. That is, in the sealed redox battery 200A, unlike the RFB 100 described above with respect to FIG. 1, neither of the positive electrolyte reservoir 106A or the negative electrolyte reservoir 106B in the enclosed cell is in fluidic communication with or physically connected to a separate electrolyte tank that stores a respective one of the first or second electrolytes. As such, substantially the entire volume of the positive and negative electrolytes is stored within the redox battery cell and sealed and enclosed by the casing 212. That is, the first electrolyte reservoir 106A stores substantially the entire volume of the first electrolyte for the first half cell 204A, and the second electrolyte reservoir 106B stores substantially the entire volume of the second electrolyte for the second half cell 204B. In part because the sealed redox battery 200A is not connected to a separate storage tank, unlike the RFB 100 illustrated in FIG. 1, the sealed redox battery 200A advantageously does not include the conduits 120A, 120B, 124A, 124B (FIG. 1) for transferring electrolytes to and from the battery cell, nor the pumps 128A, 128B (FIG. 1) for circulating the electrolytes.

As described above, a notable structural distinction of the sealed redox battery 200A is the omission of pumps 128A, 128B (FIG. 1). Instead, the sealed redox battery 200A according to embodiments are configured such that the first and second electrolytes self-circulate within respective ones of the positive electrolyte reservoir 106A of the first half cell 204A and the negative electrolyte reservoir 106B of the second half cell 204B. In various configurations, self-circulation of the first and second electrolytes is caused by one or more of: an osmotic pressure difference between the first and second electrolyte reservoirs; a density change in one or both of the first and second electrolytes; diffusion or migration of one or both of the first and second electrolytes; an affinity of one or both of the first and second electrolytes toward a respective ones of the first and second electrodes; the first and second redox half reactions; and thermal expansion or contraction of one or both of the first and second electrolytes. The inventors have discovered that self-circulation is effective to provide stability of the power and energy output when the thicknesses of the positive and negative electrolyte reservoirs 106A, 106B in the cross-sectional view of FIG. 2A do not exceed 20 cm, 15 cm, 10 cm, 5 cm, 2 cm, 1 cm or a value in a range defined by any of these values.

Still referring to FIG. 2A, the casing 212 is formed of a suitable corrosion resistant material to accommodate the positive and negative electrolytes, which can be highly acidic. In addition to providing corrosion resistance, the casing 212 may be a rigid casing to provide mechanical support for the sealed redox battery 200. In some embodiments, at least portions of the casing 212 according to embodiments may be formed of a flexible material that is configured to deform to accommodate changes in internal pressure within the positive and negative electrolyte reservoirs 106A, 106B. The increase in internal pressure may be caused, e.g., due to various effects described infra with respect to pressure-controlled sealed redox batteries. In configurations where only portions of the casing are formed of a flexible material, remaining portions may be formed of a rigid material. The flexible portions may be configured to, e.g., expand in response to an increase in pressure such that one or both of the positive and negative electrolyte reservoirs 106A, 106B may accommodate in increase in respective volume that is greater than 0.1%, 0.2%, 0.5%, 1%, 2%, 5%, 10%, 20%, 50%. The suitable material of the casing 212 can include polyvinyl chloride (PVC), polyethylene (PE), polystyrene (PS), polypropylene (PP), polycarbonate (PC), ABS, reinforced plastics, and the like.

Thus configured, the sealed redox battery 200A provides various technical and commercial advantages. For example, various reliability failures associated with the conduits, e.g., pipe joints, between the battery cell and the tanks, as well as pumps for circulating the electrolytes, are substantially reduced or eliminated, which in turn reduces unscheduled repairs as well as safety hazard and operational cost associated with operation of the sealed redox battery 200. In addition, extrinsic efficiency is substantially improved by obviating a need to circulate the electrolyte between the battery cell and the tanks using pumps, as described above with respect to the RFB 100 (FIG. 1). The inventors have realized that depending on the size of the system, the sealed redox battery 200A can improve the power or energy density by up to 2-50 times compared to conventional RFBs by obviating a need to circulate the electrolyte between the cell and the electrolyte tanks. As described above, a power or energy density refers to the power or energy output of a storage device relative to the total volume of the energy storage device, respectively. Thus, for a sealed redox battery, the power or energy density refers to a ratio of the power or energy output to the total volume of the sealed the redox battery, respectively. In addition, the space efficiency is greatly improved by the omission of a circulation system including separate tanks, pumps and conduits. Furthermore, the system complexity is greatly reduced, thereby greatly reducing the barrier to commercial implementation of the sealed redox battery 200. For example, unlike conventional RFBs, the sealed redox battery 200A can be manufactured in packs similar to lithium ion batteries for modularized implementation, rendering them more adapted for automation and mass production, without a need for intrusive construction that may be needed for installing conventional RFBs.

In the following, the operating principle and aspects of the sealed redox battery 200A are described using an example of a sealed vanadium (V) redox battery, which is based on vanadium-based redox pairs. However, it will be understood that embodiments are not so limited, and the principles described herein can be applied to redox batteries according to various other redox pairs.

In a sealed V redox battery according to embodiments, the first redox couple dissolved in the first or positive electrolyte of the first half cell 204A may be a $V^{4+}/V^{5+}$ redox couple, and the second redox couple dissolved in the second or negative electrolyte of the second half cell 204B may be a $V^{2+}/V^{3+}$ redox couple. The redox reactions during charging and discharging can be described using the following equations, where → denotes a discharge reaction direction and ← denotes a charging reaction direction:

Second half cell/Negative electrode: $V^{2+} \leftrightarrow V^{3+} + e^-$
First half cell/Positive electrode: $V^{5+} + e^- \leftrightarrow V^{4+}$
Overall reaction: $V^{2+} + V^{5+} \leftrightarrow V^{3+} + V^{4+}$ During charging, in the first half cell 204A, tetravalent vanadium ions $V^{4+}$ is oxidized to pentavalent vanadium ions $V^{5+}$, while in the second half cell 204B, trivalent ions $V^{3+}$ are reduced to bivalent ions $V^{2+}$. During discharging, in the first half cell 204A, pentavalent vanadium ions $V^{5+}$ is reduced to tetravalent vanadium ions $V^{4+}$, while in the second half cell 204B, bivalent ions $V^{2+}$ are oxidized to trivalent ions $V^{3+}$. While these redox reactions occur, electrons are transferred through an external circuit and certain ions diffuse across the ion exchange membrane 112 to balance electrical neutrality of positive and negative half cells, respectively.

Other redox reactions can be implemented in the sealed redox battery 200 according to embodiments. According to various embodiments, the first redox couple or the second redox couple includes ions of one or more of vanadium (V), zinc (Zn), bromine (Br), chromium (Cr), manganese (Mn), titanium (Ti), iron (Fe), cerium (Ce) and cobalt (Co). In some embodiments, the first and second redox couples include ions of the same metal, as in the V redox battery described above. In these embodiments, advantageously, mixing of the positive and negative electrolytes does not lead to cross-contamination of the electrolytes.

As described herein, an electrolyte of a redox battery is a solution that conducts current through ionization. The electrolyte serves to support the reduced and oxidized forms of a redox couple and also supports the corresponding cations and anions in order to balance the charge of the ions in solution during the oxidation and reduction of the redox couple. The positive and negative electrolytes according to embodiments comprise an aqueous acidic solution. For a sealed V redox battery, the concentration of V ions relates to the energy density of the electrolytes. Higher energy density can advantageously serve to reduce the volume of the positive and negative electrolyte reservoirs 106A, 106B needed for a given amount of energy and power output. However, the concentration of V ions that is too high can lower the stability of the V ions. Thus, there is an optimum range of V ions for a given application. For example, vanadium ions dissolved in the one or both of the first and second electrolyte can be greater than 1.0 M, 1.5 M, 2.0 M, 2.5 M or a value in a range defined by any of these values. On the one hand, V ion concentrations that are lower than 1.0 M can result in energy levels that are not suitable for some applications. On the other hand, V ion concentrations that are greater than 2.5 M can result in lower stability of the $V^{5+}$ ions, e.g., at operating temperatures above 50° C., and can approach the solubility limit of $V^{2+}$ and $V^{3+}$ ions in the electrolyte, e.g., at operating temperatures below −20° C.

Advantageously, according to embodiments, the positive and negative electrolytes can include the same solvent(s) and/or ions of the same metal. In these embodiments, mixing of the positive and negative electrolytes through the ion exchange membrane 112 does not result in contamination of the respective half cells. In addition, the positive and negative electrolytes may be prepared from the same starting solvent(s) and solute(s). For example, for a sealed V redox battery according to some embodiments, both the positive and negative electrolytes comprise sulfuric acid. The electrolytes can be prepared by, e.g., dissolving 0.1 M to 2.5 M $VOSO_4$ (vanadylsulfate) in 0.1 M to 6 M $H_2SO_4$ in aqueous solution, to form tetravalent vanadium ions ($V^{4+}$) and/or trivalent vanadium ions ($V^{3+}$). The tetravalent/trivalent vanadium ions can be electrochemically oxidized to form the positive electrolyte (catholyte), which contains a solution of pentavalent vanadium ions ($V^{5+}$). Conversely, the tetravalent/trivalent vanadium ions can be electrochemically reduced to form the negative electrolyte (anolyte), which contains a solution of a divalent vanadium ions ($V^{2+}$).

Still referring to FIG. 2A, in various embodiments, the positive and negative electrodes disposed in the positive and negative electrolyte reservoirs 106A, 106B, respectively, comprise carbon-based materials, such as carbon or graphite felts, carbon cloth, carbon black, graphite powder and graphene, to name a few. The carbon-based materials advantageously provide relatively high operation range, good stability and a high reversibility. The electrodes are optimized for relatively high electrochemical activity, low bulk resistivity and large specific area. The improvement of the electrochemical activity of the electrode increases the energy efficiency of the sealed redox battery 200A. To improve the performance of the sealed redox battery 200A, the surfaces of the electrode may be modified, e.g., by coating with a metal, increasing surface roughness, or doping with additives.

The positive and negative electrolyte reservoirs 106A, 106B defining the reaction spaces are partly or completely filled with respective electrodes between the ion exchange membrane 112 and the first and second bipolar plates 208A, 208B respectively when present, or between the ion exchange membrane 112 and the positive and negative current collectors 108A, 108B respectively. The remaining spaces of the positive and negative electrolyte reservoirs 106A, 106B after filling with respective electrodes are partly or completely filled with respective electrolytes between the ion exchange membrane 112 and the first and second bipolar plates 208A, 208B when present, or between the ion exchange membrane 112 and the positive and negative current collectors 108A, 108B. In various embodiments, except when intentionally perforated or rendered porous as described below, the ion exchange membrane 112 serves to substantially separate the two half-cells, and to substantially prevent the mixing of the two electrolytes and the redox couples, while allowing the transport of ions such as $H^+$ to balance the charge between the two half cells to complete the circuit during passage of current. The ion exchange membrane 112 can be an anion exchange membrane or a cation exchange membrane. The ion exchange membrane 112 can include perfluorinated ionomers, partially fluorinated polymers and non-fluorinated hydrocarbons to name a few categories of materials. Particular examples of ion exchange membrane 112 include Nation®, Flemion®, NEOSEPTA-F® and Gore Select®, which provide good chemical stability, high conductivity and mechanical strength.

While various illustrated embodiments include an ion exchange membrane 112 that can be selective to a particular type of ion, e.g., a cation or an anion, embodiments are not so limited. For example, in various embodiments, the ion exchange membrane 112 can be a non-selective membrane, e.g., a porous membrane.

Still referring to FIG. 2A, in some embodiments, the output power may be scaled by connecting a number of single redox battery cells, e.g., in series, to form a cell stack. In these configurations, first and second bipolar plates 208A, 208B may facilitate the series connection of the single cells and the current collecting plate 108A, 108B between adjacent bipolar plates can be removed. The first and second bipolar plates 208A, 208B may be formed of a suitable material such as graphite, carbon, carbon plastic or the like to provide high electrical conductivity and low internal resistance of the cell stack. Additionally, the first and second bipolar plates 208A, 208B support the contact pressure to which they are subjected when pressed against the electrodes to increase electrical conductivity. In addition, the first and second bipolar plates 208A, 208B are provided to have high acid resistance to prevent corrosion or oxidation of the current collecting plates 108A, 108B.

The positive and negative current collectors 108A, 108B comprise a metal having high electrical conductivity, such as copper or aluminum, and serve to flow electrical current during the charging and discharging processes.

As a single sealed redox battery 200A described above has an output voltage that is characteristic of the electrochemical reaction, e.g., about 1.65 V or less additional cells may be connected in electrical series or in electrical parallel to achieve higher voltages and currents, respectively, as described herein.

Figure 2B:
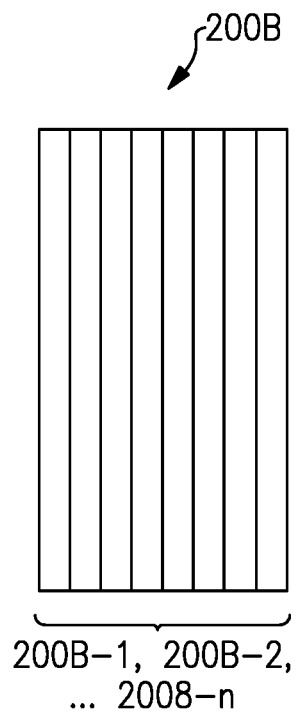
FIG. 2B is a schematic illustration of sealed redox battery comprising a plurality of sealed redox battery cells in a stacked configuration, according to some embodiments.

FIG. 2B is a schematic illustration of a sealed redox battery comprising a plurality of sealed redox battery cells in a stacked configuration, according to some embodiments. The illustrated sealed redox battery 200B includes a plurality of battery cells 200B-1, 200B-2, ..., 200B-n, which can be stacked, where each cell is configured in a similar manner as the sealed redox battery 200A (FIG. 2A). Each of the plurality of battery cells 200B-1, 200B-2, ..., 200B-n includes a positive electrolyte reservoir 106A, a negative electrolyte reservoir 106B and an ion exchange membrane 112. In the illustrated embodiment, each of the plurality of battery cells 200B-1, 200B-2, ..., 200B-n is enclosed by a separate casing 212. The plurality of battery cells 200B-1, 200B-2, ..., 200B-n may be connected in electrical series to increase the output voltage.

Figure 2C:
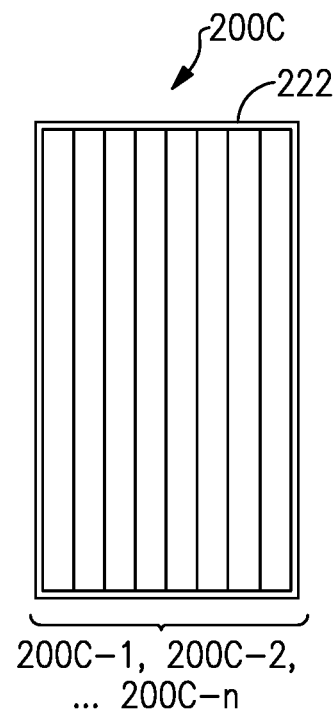
FIG. 2C is a schematic illustration of sealed redox battery comprising a plurality of sealed redox battery cells in a stacked configuration, according to some other embodiments.

FIG. 2C is a schematic illustration of sealed redox battery comprising a plurality of sealed redox battery cells in a stacked configuration, according to some other embodiments. The illustrated sealed redox battery 200C includes a plurality of battery cells 200C-1, 200C-2, ..., 200C-n, which can be stacked, where each of the plurality of battery cells 200C-1, 200C-2, ..., 200C-n is configured in a similar manner as the sealed redox flow battery 200 (FIG. 2A), including a positive electrolyte reservoir 106A, a negative electrolyte reservoir 106B and an ion exchange membrane 112. However, unlike the sealed redox battery 200B (FIG. 2B), in the illustrated embodiment, the plurality of battery cells 200C-1, 200C-2, ..., 200C-n are enclosed by a common casing 222. In a similar manner as the sealed redox battery 200B (FIG. 2B), the plurality of battery cells 200C-1, 200C-2, ..., 200C-n may be connected in electrical series to increase the output voltage. Furthermore, in some embodiments, the positive electrolyte reservoirs 106A of the plurality of battery cells 200C-1, 200C-2, ... 200C-n may be in fluidic communication with each other, and the negative electrolyte reservoirs 106B of the plurality of battery cells 200C-1, 200C-2, ..., 200C-n may be in fluidic communication with each other. The sealed redox battery 200C may be configured as a pouch type battery or a rigid case type battery.

Figure 2D:
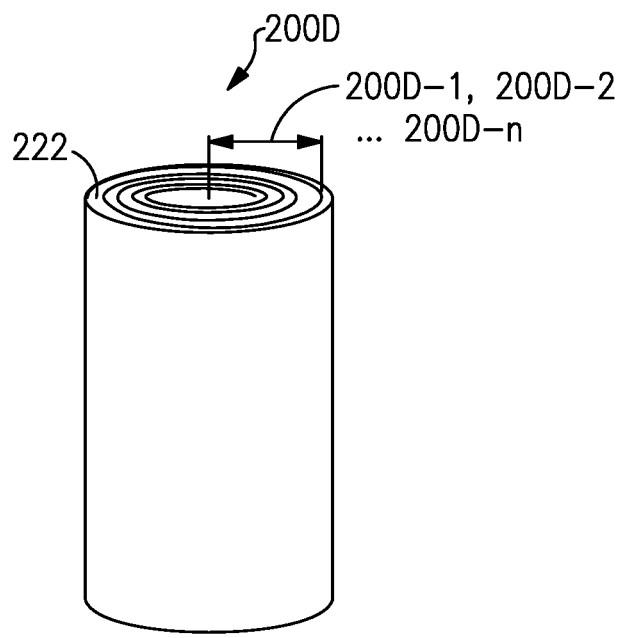
FIG. 2D is a schematic illustration of sealed redox battery comprising a plurality of sealed redox battery cells in a cylindrically stacked configuration, according to embodiments.

FIG. 2D is a schematic illustration of sealed redox battery comprising a plurality of sealed redox battery cells in a cylindrically stacked configuration, according to embodiments. The illustrated sealed redox battery 200D includes a plurality of battery cells 200D-1, 200D-2, ..., 200D-n, which can be cylindrically stacked, where each of the plurality of battery cells 200D-1, 200D-2, ..., 200D-n is configured in a similar manner as the sealed redox flow battery 200 (FIG. 2A), including a positive electrolyte reservoir 106A, a negative electrolyte reservoir 106B and an ion exchange membrane 112. The plurality of battery cells 200D-1, 200D-2, ..., 200C-n may individually be enclosed in a casing in a similar manner as described above with respect to the sealed redox battery 200B (FIG. 2B). Alternatively, the plurality of battery cells 200D-1, 200D-2, ..., 200C-n may enclosed by a common casing 222 in a similar manner as described above with respect to the sealed redox battery 200C (FIG. 2C). In a similar manner as the sealed redox batteries 200B (FIG. 2B), the plurality of battery cells 200D-1, 200D-2, ..., 200D-n may be connected in electrical series to increase the output voltage.

Furthermore, in some embodiments, the positive electrolyte reservoirs 106A of the plurality of battery cells 200D-1, 200D-2, ..., 200D-n may be in fluidic communication with each other, and the negative electrolyte reservoirs 106B of the plurality of battery cells 200D-1, 200D-2, ..., 200D-n may be in fluidic communication with each other.

It will be appreciated that some or all of the plurality of battery cells in each of the stacked configurations described above with respect to FIGS. 2B-2C may be connected in electrical series, by suitably electrically connecting current collectors of opposite polarities of some or all of the cells, or in electrical parallel, by suitably electrically connecting current collectors of the same polarity of some of all of the cells.

Distinctions of Sealed Redox Battery Compared to Conventional Secondary Batteries The distinctions and advantages of sealed redox batteries according to embodiments against conventional RFBs have been described above, including the omission of electrolyte tanks, a pumping system and a network of conduits, which have contributed to the slow commercial implementation of conventional RFBs. While no separate electrolyte tanks may be present, the sealed redox batteries 200A-200D (FIGS. 2A-2D) retain some of the unique design flexibility available in conventional RFBs. For example, due to the intrinsic conformability of liquids, the design of cell geometry are substantially more flexible compared to conventional secondary batteries. Moreover, the power and energy storage capacity can be decoupled and scaled independently to a limited extent, e.g., by adjusting the ratio of electrolyte volume relative to the electrode surface area. The ratio can be adjusted using, e.g., the thickness of the positive and negative electrolyte reservoirs 106A, 106B, as described above. On the other hand, the sealed redox batteries according to embodiments also share major advantages of conventional batteries, because they are completely sealed to enable modularized implementation. While sealed redox batteries according to embodiments and conventional secondary batteries, e.g., LIBs, may have components referred to using similar terminologies, it will be appreciated that the components of the sealed redox batteries according to embodiments and their operational principles are distinguishable from those of conventional secondary batteries, as described herein. In the following, while comparisons may be made between sealed redox batteries according to embodiments and LIB s, it will be understood that the comparisons are applicable to other conventional secondary batteries.

First, the structure, functional role and operational principle of the electrolytes in the sealed redox battery according to embodiments are distinguishable from those of conventional secondary batteries, e.g., LIBs. In operation, in LIBs, the electrolyte does not itself store energy nor participate in the electrochemical reactions in the charge/discharge processes. Instead, the electrolyte in LIBs primarily serves to provide a path for lithium ions to be transported between the positive electrode and the negative electrode during the charging/discharging process. Therefore, the movement of the electrolyte is not substantially restricted by the separator. In contrast, in the sealed redox battery 200 according to embodiments, electrochemical energy is stored in the electrolytes in the form of dissolved active material, e.g., respective redox pairs dissolved in the positive and negative electrolytes that undergo electrochemical reactions during the charge/discharge processes. Thus, the electrolytes can be said to be the medium which stores the energy in the sealed redox batteries according to embodiments. In the example of V redox battery, as described above, the oxidation states of V ion species dissolved in the positive and negative electrolytes are changed by the respective half reactions. Thus, the chemical compositions of the positive and negative electrolytes in sealed redox batteries are different from the electrolyte of LIBs. Further unlike LIBs, in sealed redox batteries according to embodiments, since the electromotive force resulting from the difference in the chemical compositions of the positive electrolyte and the negative electrolyte leads to energy storage, mixing of the positive and negative electrolytes leads to a loss of stored energy.

Second, the structure, functional role and operational principle of the electrodes in the sealed redox battery according to embodiments are distinguishable from those of conventional secondary batteries, e.g., LIBs. In LIBs, the active materials, which are included in the electrodes, directly participate electrochemical reactions. In operation, in a LIB, lithium ions move between an active material of the positive electrode and an active material of the negative electrode to achieve electrochemical equilibrium, and the electrodes themselves serve as the main media for energy storage. In contrast, the electrodes of the sealed redox battery according to embodiments serve a very different role. The positive electrode of a sealed redox battery does not participate in the first redox half reaction and the negative electrode of the sealed redox battery does not participate in the second redox half reaction. As described herein, an electrode that does not participate in a redox half reaction does not preclude the electrode's function of providing a physical site for the electrochemical reaction in an analogous manner as a catalyst. However, the electrodes themselves are not involved in the electrochemical reactions and redox ions do not move between positive and negative electrodes during charging and discharging of the battery. Depending on the composition, a functional group acting as a catalyst may exist on the surface. However, this is distinguishable from the electrodes actively participating in the electrochemical reaction as in the case with LIBs. Rather, the electrodes substantially passively transport electrons generated by the electrochemical reactions.

Third, the structure, functional role, and operational principle of the ion exchange membrane in the sealed redox battery according to embodiments are distinguishable from those of a separator in conventional secondary batteries, e.g., LIBs. In a LIB the active materials of electrodes where the electrochemical reactions take place are generally in the solid state, and a separator disposed between positive and negative electrodes primarily serves to prevent an electrical short therebetween. So, while the separator serves to prevent an electrical contact between the positive and negative electrodes, in a LIB the separator is not specifically designed to restrict the transport of lithium ions therethrough nor to restrict the electrochemical reactions therebetween. In other words, the separator in a LIB primarily serves to electrically insulate the positive and negative electrodes from each other without interfering the transport of ions as part of the electrochemical reactions for charging and discharging. Thus, a separator for a LIB is designed freely transport the lithium ions between the electrodes. In contrast, in the sealed redox battery according to embodiments, the redox active species are dissolved in the electrolyte, and the ion exchange membrane 112 (FIG. 2A) serves to electrically separate the positive and negative electrolytes and to prevent them from mixing with each other. In general, the ion exchange membrane 112 comprises a selective permeable membrane in which cations or anions are transported therebetween to balance the charge between the two half cells. For example, the ion exchange membrane may be configured to selectively pass therethrough cations or anions. Thus, in sealed redox batteries according to embodiments, since the electrolytes that store energy are liquids, without the ion exchange membrane 112, an electrical short by mixing of the positive and negative electrolytes occurs, regardless of whether the positive and negative electrodes contact each other. Therefore, in a sealed redox batteries according to embodiments, the first and second redox half reactions occur without substantial transfer of ions of the first redox couple or the second redox couple across the ion exchange membrane 112 separating the positive electrolyte reservoir 106A and the negative electrolyte reservoir 106B. As described herein, an ion exchange membrane 112 that substantially does not transfer ions of the redox couples refers an ion exchange membrane 112 that serves to substantially prevent the crossover of the electrolytes between the positive and negative electrolyte reservoirs 106A, 106B (FIG. 2A). Thus, a base material for the ion exchange membrane 112 may desirably be a membrane that blocks the movement of the redox species in the electrolyte, e.g., the V ions in a V redox battery, while selectively permitting the movement of other ions, e.g., ions in a V redox battery for the charge balance between the half cells. However, an ion exchange membrane 112 that substantially does not transfer ions of the redox couples can still permit unintended crossover, or limited intended mixing to relieve internal pressure build-up, as described infra.

Pressure-Controlled Sealed Redox Batteries

As described above, sealed redox batteries according to embodiments overcome major obstacles of commercialization of conventional RFBs, in part due to the omission of electrolyte tanks, a pumping system and a network of conduits. On the other hand, in part due to the sealed architecture, they offer major advantages offered by conventional secondary batteries, including simpler and compact designs. While offering these major advantages, the inventors have realized that certain technical problems may arise from the sealed architecture of the sealed redox batteries according to embodiments. In the following, these problems are described, along with technical features to address these and other problems.

The inventors have realized that one of the technical challenges associated with the sealed redox batteries arises from structural limitations of the ion exchange membrane. As described above, the material of the ion exchange membrane 112 (FIG. 2A) ideally electrically separates and prevents mixing of the positive and negative electrolytes having dissolved therein the redox active species, e.g., V ions in a V redox battery, while selectively passing therethrough specific ions, e.g., $H^+$ ions in a V redox battery. However, in practice, undesirable mixing of electrolytes and the redox active species does occur through the ion exchange membrane 112 (FIG. 2A). For example, in V redox batteries, mixing of water, sulfuric acid, and V ions occur across the ion exchange membrane 112 between the positive and negative electrolyte reservoirs 106A, 106B. This phenomenon, collectively referred to as crossover, is generally viewed as a phenomenon that lowers the long-term life and energy efficiency of the redox battery. The crossover is further accelerated during the charging/discharging process. For example, for V redox batteries, crossover occurs from the positive electrolyte reservoir 106A to the negative electrolyte reservoir 106B through the ion exchange membrane comprising perfluorosulfonic acid (PFSA), during the charging process, and in the opposite direction during the discharge process. Depending on the redox chemistry and the characteristics of the ion exchange membrane, the crossover can be net directional. The inventors have discovered that, for some systems such as V redox batteries, the degree of crossover during the discharging process is greater than the degree of crossover during the charging process, and as charging and discharging is repeated, an imbalance between the volume of the positive electrolyte and the volume of the negative electrolyte accumulates. This leads to an imbalance in the electrolyte amounts and the concentrations of ions between the positive and negative electrolyte reservoirs 106A and 106B. This imbalance in turn can leads to negative or positive pressure buildup in one or both of the positive and negative electrolyte reservoirs 106A and 106B. As the charge and discharge processes are repeated, the accumulated imbalance of the electrolyte volumes between the positive and negative electrolyte reservoirs 106A, 106B and the resulting pressure buildup leads to a decrease in energy capacity and efficiency, and eventually to permanent damage of the sealed redox battery.

It will be appreciated that the effect of directional mass transfer caused by crossover can be more severe in the sealed redox batteries according to embodiments, compared to conventional RFBs. This is because, while the electrolyte tanks of RFBs allow for some compensation of the change in the volumes of electrolytes in the positive and negative electrolyte reservoirs 106A, 106B, due to the absence of the electrolyte tanks, the volumes inside the positive and negative electrolyte reservoirs 106A, 106B of sealed redox batteries according to embodiments are relatively fixed. As a result, the imbalance of the electrolyte volumes between the positive and negative electrolyte reservoirs 106A, 106B, and the resulting pressure buildup increases the likelihood of deformation and damage to various components of the battery including the ion exchange membrane 112, the positive and negative electrodes, the positive and negative electrolyte reservoirs 106A, 106B and/or the casing 212. In addition to the pressure buildup caused by crossover, because the sealed redox batteries according to embodiments are more thermally isolated compared to conventional RFBs that allow for some exchange of heat through exchange of the electrolytes between the battery cells and the electrolyte tank, the sealed redox batteries may be more vulnerable changes in temperature of the electrolytes. Higher temperatures can not only cause the electrolytes to thermally expand, but also cause or accelerate side reactions such as hydrogen evolution and $CO_2$ evolution, which can further increase the pressure buildup inside the sealed redox batteries. In the following, various embodiments are described, which solve these and other technical challenges associated with the sealed redox batteries.

FIGS. 3A-3C schematically illustrate sealed redox batteries configured to reduce or at least partly prevent a pressure buildup in one or both of the positive electrolyte reservoir and the negative electrode reservoir, according to embodiments. Each of the sealed redox batteries illustrated in FIGS. 3A-3C includes, in addition to the various features of the sealed redox battery 200A described above with respect to FIG. 2A, a pressure relieving means for reducing or at least partly preventing a pressure buildup in one or both of the positive electrolyte reservoir and the negative electrode reservoir during operation. The pressure relieving means is configured to or at least partly prevent the pressure buildup by controllably mixing, e.g., directly mixing, the positive electrolyte in the positive electrolyte reservoir 106A and the negative electrolyte in the negative electrolyte reservoir 106B. It will be appreciated that, while mixing of electrolytes can lead to a decrease in battery efficiency in sealed redox batteries according to embodiments, any loss in the power output resulting the decrease in battery efficiency can be substantially lower than the energy expenditure in conventional RFBs for circulating the electrolytes. In the following, the casing is omitted from illustrated sealed redox batteries for clarity. However, it will be understood that each of the illustrated sealed redox battery configurations includes a casing 212 in a similar manner as described above with respect to FIGS. 2A-2D.

FIG. 3A schematically illustrates a sealed redox battery configured to reduce or at least partly prevent a pressure buildup in one or both of the positive electrolyte reservoir and the negative electrolyte reservoir by controllably permitting mixing the positive and negative electrolytes using a conduit connecting the positive and negative electrolyte reservoirs, according to some embodiments. The sealed redox battery 300A is configured in a similar manner as the sealed redox battery 200A described above with respect to FIG. 2A except, the sealed redox battery 300A further comprises a pressure relief conduit 304 directly connecting the positive electrolyte reservoir 106A and the negative electrolyte reservoir 106B. To relieve the pressure difference that develops between the positive and negative electrolyte reservoirs 106A, 106B, the conduit 304 allows for controlled transfer of the electrolyte from the electrolyte reservoir having a higher pressure to the electrolyte reservoir having a lower pressure, thereby permitting mixing of the electrolytes between the positive and negative electrolyte reservoirs 106A, 106B. As described above, in general, the mixing of the positive and negative electrolytes causes a decrease in energy capacity and efficiency, or even damage to the sealed redox battery. However, the conduit 304 is adapted to controllably limit the amount of mixing of the electrolytes to a controlled low level that is proportional to the volume of electrolyte crossover. According to embodiments, the amount of permitted flow of an electrolyte from one to the other of the positive and negative electrolyte reservoirs 106A, 106B is controlled to be less than or equal to the amount of the electrolyte crossover that would occur from one to the other of the positive and negative electrolyte reservoirs 106A, 106B in the absence of the conduit 304. This is achieved by, e.g., providing a buffer volume in the conduit 304 that is equal to or greater than the amount of electrolyte that is transferred as a result of crossover. According to embodiments, the volume of electrolyte that is transferred or cross-transferred, per charge or discharge cycle, between the positive and negative electrolyte reservoirs 106A, 106B may be less than 0.001%, 0.01%, 0.1%, 1%, 10% or a percentage in a range defined by any of these values, of the volume of the electrolyte in one or both of the positive and negative electrolyte reservoirs 106A, 106B. The buffer volume provided by the conduit 304 may be about equal or greater than, e.g., the volume of electrolyte that is transferred or cross-transferred between the positive and negative electrolyte reservoirs 106A 106B in one charge or discharge cycle.

FIGS. 3B, 3B-1 and 3B-2 schematically illustrates a sealed redox battery configured to reduce or at least partly prevent a pressure buildup in one or both of the positive electrolyte reservoir and the negative electrode reservoir by controllably permitting mixing of the positive and negative electrolytes using an ion exchange membrane having one or more openings therethrough, according to some other embodiments. Referring to FIG. 3B, the illustrated sealed redox battery 300B is configured in a similar manner as the sealed redox battery 200A described above with respect to FIG. 2A except, the sealed redox battery 300B comprises an ion exchange membrane 312B comprising one or more holes or openings 308 formed therethrough. The illustrated ion exchange membrane 312B may be substantially similar to the ion exchange membrane 112 illustrated in FIG. 2A, but for the one or more openings 308. To relieve the pressure difference that develops between the positive and negative electrolyte reservoirs 106A, 106B, the one or more holes 308 allows for controlled transfer of the electrolyte from the electrolyte having a higher pressure to the electrolyte reservoir having a lower pressure, thereby permitting mixing of the electrolytes between the positive and negative electrolyte reservoirs 106A, 106B. The size, position and number of holes 308 is designed to permit an amount of intentional mixing to a controlled low level that is proportional to the volume of electrolyte crossover. According to embodiments, the amount of permitted flow of an electrolyte from one to the other of the positive and negative electrolyte reservoirs 106A, 106B is controlled to be less than or equal to the amount of the electrolyte crossover that would occur from one to the other of the positive and negative electrolyte reservoirs 106A, 106B in the absence of the holes 308. According to embodiments, the hole(s) 308 can have lateral dimensions, e.g., diameters that are greater than 10 nm, 100 nm, 1 µm, 10 µm, 100 µm, 1 mm, 10 mm, or a value in a range defined by any of these values. According to embodiments, the overall volume and rate of permitted flow of an electrolyte from one to the other of the positive and negative electrolyte reservoirs 106A, 106B is controlled to be similar to values described above with respect to the sealed redox battery 300A described above with respect to FIG. 3A. It will be appreciated that the rate of crossover through the ion exchange membrane 112 (FIG. 2A) increases in proportion to the power output. Therefore, at higher power output, the electrolyte imbalance caused by increased crossover should be relieved relatively quickly. By intentionally allowing a mixing in the opposite direction through the holes 308 to offset the electrolyte imbalance, the stability of the power output at higher power output can be improved. While the increased mixing can lead to a decrease in battery efficiency, the increased stability of the power output at higher output can at least partly compensate the reduced battery efficiency using the configuration of the sealed redox battery 300B.

FIG. 3B-1 schematically illustrates a sealed redox battery configured to reduce or at least partly prevent pressure buildup in one or both of a positive electrolyte reservoir and a negative electrode reservoir using an ion exchange membrane having one or more openings formed therethrough, according to an alternative embodiment. The sealed redox battery 300B-1 is configured in a similar manner to the sealed redox battery 300B (FIG. 3B) except, instead of the ion exchange membrane 312B (FIG. 3B) that is substantially similar to the ion exchange membrane 112 (FIG. 2A) but for the one more openings 308 (FIG. 3B), the sealed redox battery 300B-1 comprises an ion exchange membrane 312B-1 having a portion replaced with one of more buffer volume structures 309 each having a partly enclosed buffer volume. The partly enclosed buffer volume is defined by sidewalls each having an opening formed therethrough. In operation, in response to an increased pressure in one or both of the positive and negative electrolyte reservoirs 106A, 106B as described above, the electrolyte(s) from one or both of the positive and negative electrolyte reservoirs 106A, 106B pass through the opening(s) to fill the partly enclosed buffer volume with one or both of the positive and negative electrolytes. Thus configured, the partly enclosed buffer volume may serve to limit the cross-mixing of the electrolytes between the positive and negative electrolyte reservoirs 106A, 106B.

FIG. 3B-2 schematically illustrates a sealed redox battery configured to reduce or at least partly prevent pressure buildup in one or both of a positive electrolyte reservoir and a negative electrode reservoir using an ion exchange membrane having one or more openings formed therethrough, according to another alternative embodiment. The sealed redox battery 300B-2 is configured in a similar manner to the sealed redox battery 300B (FIG. 3B) except, instead of the exchange membrane 312B (FIG. 3B) that is substantially similar to the ion exchange membrane 112 (FIG. 2A) but for the one more openings 308 (FIG. 3B), the sealed redox battery 300B-2 comprises an ion exchange membrane 312B-2 having a portion replaced one of more electrical short prevention structures 310 each having an opening formed therethrough. Each of the electrical short prevention structures 310 comprises portions that protrude in opposing directions towards the positive and negative current collectors 108A, 108B. In operation, in response to an increased pressure in one or both of the positive and negative electrolyte reservoirs 106A, 106B as described above, the electrolyte(s) from one or both of the positive and negative electrolyte reservoirs 106A, 106B pass through the openings in a similar manner as described above with respect to FIG. 3B. In addition, the electrical short prevention structures 309 serve to prevent the positive and negative electrode from contacting each other through the openings. Such contact would create an electrical short.

It will be appreciated that, in each of the sealed redox batteries 300B (FIG. 3B), 300B-1 (FIG. 3B-1) and 300B-2 (FIG. 3B-2), there exists a buffer volume formed at or near the openings, in which the electrolytes are permitted to mix while preventing electrodes from contacting each other. In the redox battery 300B (FIG. 3B), the buffer volume is created by the volume of the opening(s) 308 formed the ion exchange membrane 312B. In the redox battery 300B-1 (FIG. 3B-1), the buffer volume is created by the volume of the partly enclosed buffer volume and the openings through the sidewalls of buffer volume structures 309. In the redox battery 300B-2 (FIG. 3B-2), the buffer volume is created by the volume of the opening(s) formed through the electrical short prevention structure(s) 309. The buffer volume provided in each of the sealed redox batteries 300B (FIG. 3B), 300B-1 (FIG. 3B-1) and 300B-2 (FIG. 3B-2) is designed to be equal to or greater than the volume of electrolyte that is transferred as a result of crossover. As described above, the volume of electrolyte that is transferred or cross-transferred, per charge or discharge cycle, between the positive and negative electrolyte reservoirs 106A, 106B may be less than 0.001%, 0.01%, 0.1%, 1%, 10% or a percentage in a range defined by any of these values, of the volume of the electrolyte in one or both of the positive and negative electrolyte reservoirs 106A, 106B.

FIG. 3C schematically illustrates a sealed redox battery configured to reduce or at least partly prevent a pressure buildup in one or both of the positive electrolyte reservoir and the negative electrode reservoir by controllably permitting mixing of the positive and negative electrolytes, according to yet some other embodiments. The sealed redox battery 300C is configured in a similar manner as the sealed redox battery 200A described above with respect to FIG. 2A except, the sealed redox battery 300C comprises an ion exchange membrane 312C having a porous structure. To relieve the pressure difference that develops between the positive and negative electrolyte reservoirs 106A, 106B, the porous structure allows for controlled transfer of the electrolyte from the electrolyte having a higher pressure to the electrolyte reservoir having a lower pressure, thereby permitting mixing of the electrolytes between the positive and negative electrolyte reservoirs 106A, 106B. The size and areal density of the pores of the porous structure are designed to permit an amount of intentional mixing to a controlled low level that is proportional to the volume of electrolyte crossover. According to embodiments, the amount of permitted flow of an electrolyte from one to the other of the positive and negative electrolyte reservoirs 106A, 106B is controlled to be less than or equal to the amount of the electrolyte crossover that would occur from one to the other of the positive and negative electrolyte reservoirs 106A, 106B with nonporous ion exchange membrane. According to embodiments, the pores of the ion exchange membrane 312C can have lateral dimensions, e.g., diameters that are greater than 1 nm, 10 nm, 100 nm, 1 µm, 10 µm, 100 µm, 1 mm, or a value in a range defined by any of these values. In some embodiments, the ion exchange membrane includes porous portions and nonporous portions. According to embodiments, the overall amount and rate of permitted flow of an electrolyte from one to the other of the positive and negative electrolyte reservoirs 106A, 106B is controlled to be similar to values described above with respect to the sealed redox battery 300A (FIG. 3A). In a similar manner as described above with respect to the sealed redox battery 300B (FIG. 3B), while the increased mixing can lead to a decrease in battery efficiency, the increased stability of the power output at higher output can at least partly compensate the reduced battery efficiency using the configuration of the sealed redox battery 300C.

Figure 4:
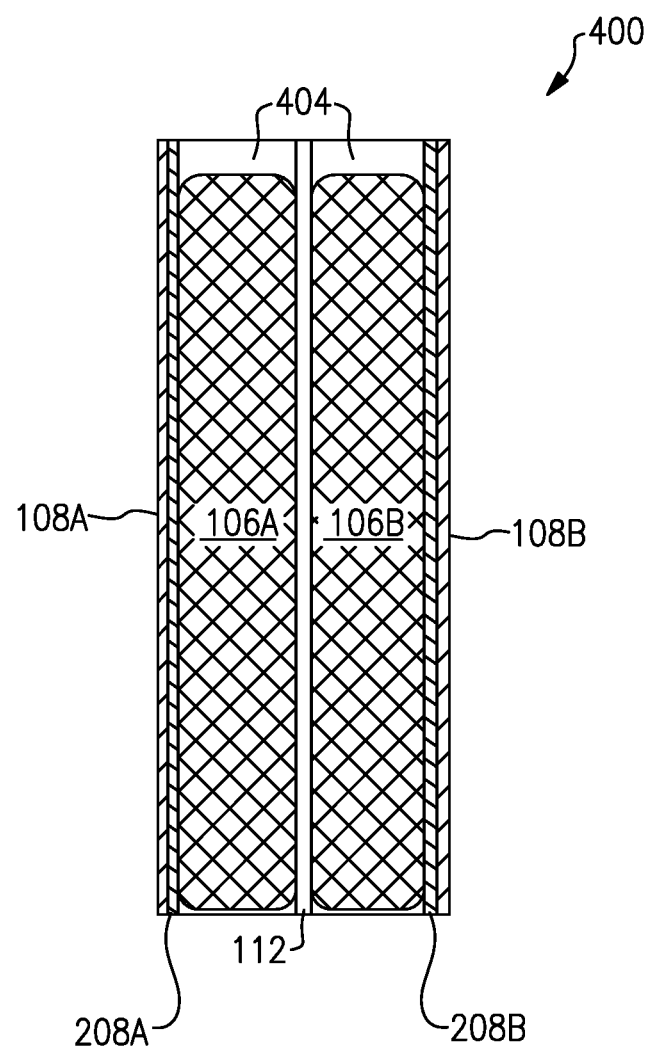
FIG. 4 schematically illustrates a sealed redox battery configured to reduce or at least partly prevent pressure buildup in one or both of a positive electrolyte reservoir and a negative electrolyte reservoir, according to embodiments.

FIG. 4 schematically illustrates a sealed redox battery configured to reduce or at least partly prevent a pressure buildup in one or both of the positive electrolyte reservoir and the negative electrode reservoir, according to some other embodiments. The sealed redox battery 400 is configured in a similar manner as the sealed redox battery 200A described above with respect to FIG. 2A except, the sealed redox battery 400 illustrated in FIG. 4 further includes, in addition to the various features of the sealed redox battery 200A described above with respect to FIG. 2A, a pressure relieving means for reducing or at least partly preventing a pressure buildup in one or both of the positive electrolyte reservoir and the negative electrode reservoir during operation. The pressure relieving means is configured to or at least partly prevent the pressure buildup by accommodating an increase in the volumes of liquids or gases inside the positive and negative electrolyte reservoirs 106A, 106B. In the illustrated embodiment, the pressure relieving means comprises an excess or free volume 404 formed in one or both of the positive electrolyte 106A and the negative electrolyte reservoir 106B. As described herein, an excess or free volume refers to a volume within the positive and negative electrolyte reservoirs 106A, 106B that is intentionally unfilled with the respective electrolyte. Thus, in these embodiments, one or both of the positive and negative electrolyte reservoirs 106A, 106B are only partly filled with the respective ones of the positive and negative electrolytes. When the electrolyte in one of both of the positive and negative electrolyte reservoirs 106A, 106B expands, e.g., due to crossover as described above or due to thermal expansion of the electrolyte, the excess or free volume 404 may accommodate the increased volume to reduce or prevent a pressure buildup in one or both of the positive and negative electrolyte reservoirs 106A, 106B. For example, when the temperature inside the sealed redox battery 400 increases due to internally generated heat or due to heat from the external environment, pressure buildup that results therefrom may at least partly be accommodated by the excess or free volume 404 by accommodating the increased volume of the electrolyte due to thermal expansion. Such pressure buildup can occur from e.g., thermal expansion of the electrolyte, evolution of the dissolved gas from the electrolyte due to reduced solubility, and generation or expansion of gas inside the battery. The size of excess or free volumes 404 can be determined based on the expected thermal expansion of the electrolytes and the expected generation and/or expansion of gases at the expected peak temperature, e.g., 60° C., relative to a base temperature, e.g., room temperature. According to embodiments, the excess or free volume 404 can occupy a volume that is greater than 0.1%, 0.2%, 0.5%, 1%, 2%, 5%, 10%, 20%, 50% or a value in a range defined by any of these values, on the basis of the total volume of the respective positive and negative electrolyte reservoirs 106A, 106B.

Figure 5A:
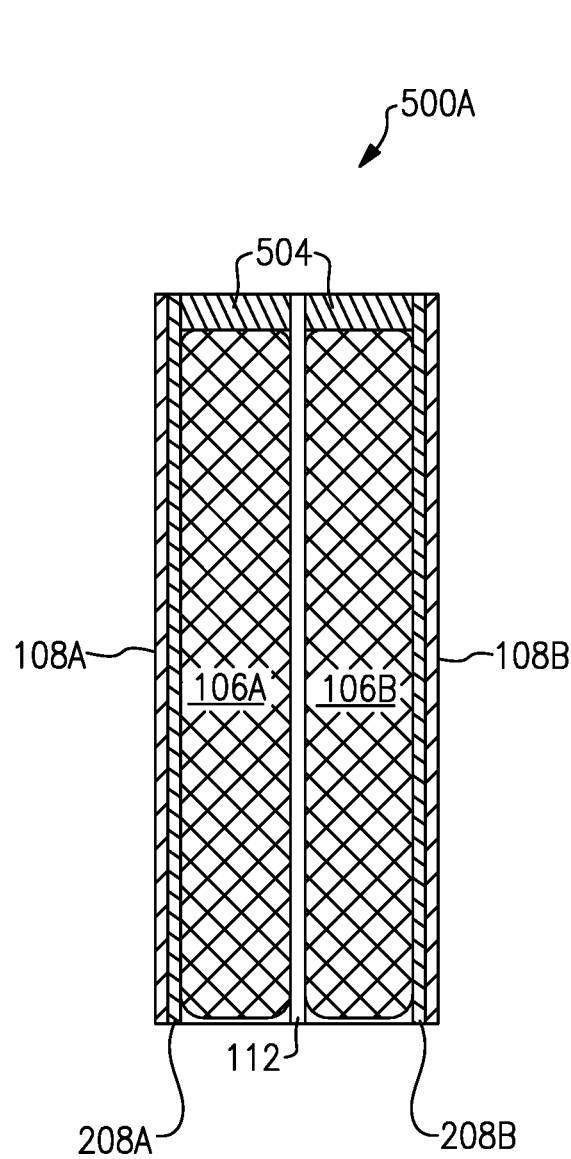
FIGS. 5A-5B schematically illustrate sealed redox batteries configured to reduce or at least partly prevent pressure buildup in one or both of a positive electrolyte reservoir and a negative electrolyte reservoir, according to embodiments.
Figure 5B:
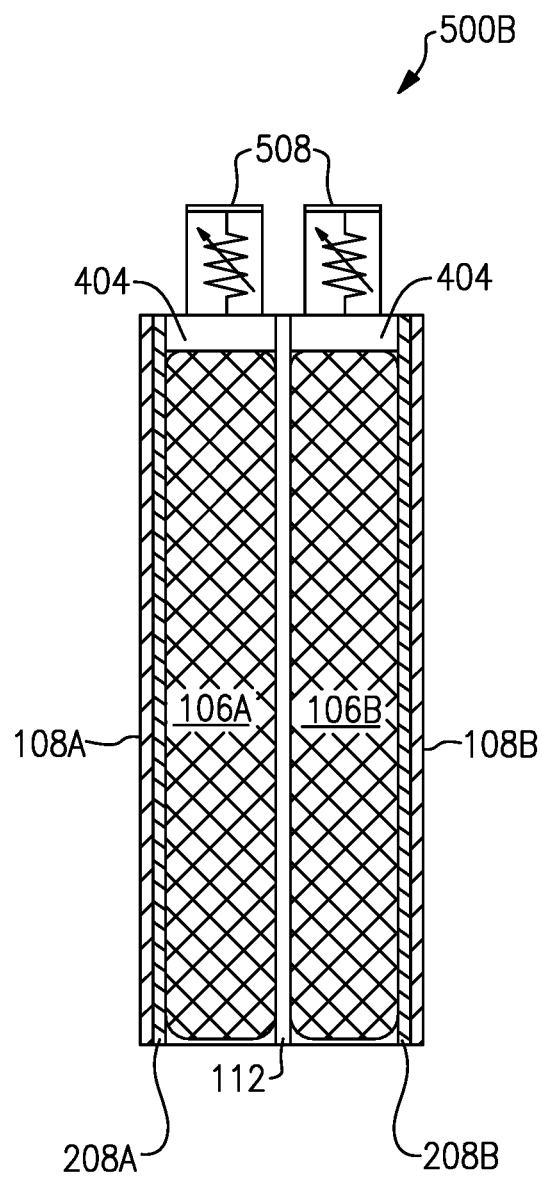

FIGS. 5A and 5B schematically illustrate sealed redox batteries configured to reduce or at least partly prevent a pressure buildup in one or both of the positive electrolyte reservoir and the negative electrode reservoir, according to some other embodiments. Each of the sealed redox batteries 500A and 500B illustrated in FIGS. 5A and 5B, respectively, includes, in addition to the various features of the sealed redox battery 200A described above with respect to FIG. 2A, a pressure relieving means for reducing or at least partly preventing a pressure buildup in one or both of the positive electrolyte reservoir and the negative electrode reservoir during operation. The pressure relieving means is configured to reduce or at least partly prevent the pressure buildup by reducing a gas buildup on one or both of the positive and negative electrolyte reservoirs 106A, 106B. As described above, side reactions during charging and/or discharging can generate gases such as hydrogen due to water decomposition, $CO_2$ from the oxidation of carbon-based electrodes, and $O_2$, to name a few examples. These side reactions can lead to pressure buildup inside the sealed redox batteries, and the magnitude of the pressure buildup can be accelerated at higher temperatures.

FIG. 5A schematically illustrates a sealed redox battery configured to reduce or at least partly prevent a pressure buildup in one or both of the positive electrolyte reservoir and the negative electrode reservoir by reducing a gas buildup on one or both of the positive and negative electrolyte reservoirs 106A, 106B. The sealed redox battery 500A is configured in a similar manner similar to the sealed redox battery 200A described above with respect to FIG. 2A except, the sealed redox battery 500A further comprises a gas-reducing layer 504 formed in one or both of the positive and negative electrolyte reservoirs 106A, 106B. The gas-reducing layer 504 may be configured to reduce, e.g., selectively reduce, a gas species that may be generated in operation by suitable means, e.g., absorption, reaction or catalytic conversion. While the gas-reducing layer 504 is illustrated to be formed on an upper inner surface of the positive and negative electrolyte reservoirs 106A, 106B, embodiments are not so limited, and the gas-reducing layer 504 can be formed on any surface within the positive and negative electrolyte reservoirs 106A, 106B, including surfaces of the respective electrodes.

In one embodiment, the gas-reducing layer 504 is selectively configured to reduce the hydrogen gas that may be generated in a side reaction, as described above. For example, the gas-reducing layer 504 may comprise platinum (Pt), which serves as a catalyst that converts hydrogen and oxygen into heat and water. The gas-reducing layer 504 may comprise a platinum-carbon (Pt/C) composite material or a platinum-carbon-polymer (Pt/C/polymer) composite material. The Pt/C or Pt/C/polymer composite material may include nanocrystalline Pt platinum formed on surfaces of carbon-based structure such as carbon black (CB). For a given volume, the nanocrystalline Pt has a relatively large surface to volume ratio for efficient catalytic conversion of hydrogen and oxygen. Thus configured, the gas-reducing layer 504 may substantially reduce or eliminate the gas buildup that may result from hydrogen and oxygen gas generation. The amount of the gas-reducing layer 504 may be determined based on the amount of gas that is expected to be generated with the range of operational temperatures. According to embodiments, the gas-reducing layer can occupy a volume that is greater than 0.1%, 0.2%, 0.5%, 1%, 2%, 5%, 10%, 20% or a value in a range defined by any of these values, on the basis of the total volume of the respective positive and negative electrolyte reservoirs 106A, 106B.

FIG. 5B schematically illustrates a sealed redox battery configured to reduce or at least partly prevent a pressure buildup in one or both of the positive electrolyte reservoir and the negative electrode reservoir by reducing a gas buildup on one or both of the positive and negative electrolyte reservoirs 106A, 106B. The sealed redox battery 500B is configured in a similar manner as the sealed redox battery 200A described above with respect to FIG. 2A except, the sealed redox battery 500B further comprises a gas-relief valve 508 connected to one or both of the positive and negative electrolyte reservoirs 106A, 106B, and an excess or free volume 404 for accommodating the gas. The gas-relief valve 508 may be configured to release the gas that may have accumulated in the battery to outside of the first and/or positive and negative electrolyte reservoirs 106A, 106B, while preventing liquid from being released therethrough. The gas-relief valve 508 may be configured such that, when the gas pressure inside the excess volume 404 reaches a set pressure, the gas is released therethrough to reduce or partly prevent a pressure buildup inside the he positive and negative electrolyte reservoirs 106A, 106B.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and subcombinations of features of this disclosure are intended to fall within the scope of this disclosure.

What is claimed is:

1. A redox battery, comprising:
   a first half cell comprising a positive electrolyte reservoir comprising a first electrolyte contacting a positive electrode and having dissolved therein a first redox couple configured to undergo a first redox half reaction;
   a second half cell comprising a negative electrolyte reservoir comprising a second electrolyte contacting a negative electrode and having dissolved therein a second redox couple configured to undergo a second redox half reaction;
   an ion exchange membrane separating the positive electrolyte reservoir and the negative electrolyte reservoir, wherein the first half cell, the second half cell and the ion exchange membrane defining a redox battery cell are sealed in a casing,
   wherein neither of the positive electrolyte reservoir nor the negative electrolyte reservoir of the redox battery cell is connected to a separate electrolyte tank storing a respective one of the first or second electrolytes; and
   a pressure relieving structure comprising a pressure relief conduit directly connecting the positive electrolyte reservoir and the negative electrolyte reservoir,
   wherein the pressure relieving structure is configured to reduce or at least partly prevent a pressure buildup in one or both of the positive electrolyte reservoir and the negative electrode reservoir during operation by controllably mixing the first and second electrolytes.

2. The redox battery of claim 1, wherein the first redox couple and the second redox couple include ions of the same metal.

3. The redox battery of claim 1, wherein the first redox couple or the second redox couple includes ions of one or more of vanadium (V), zinc (Zn), bromine (Br), chromium (Cr), manganese (Mn), titanium (Ti), iron (Fe), cerium (Ce) and cobalt (Co).

4. The redox battery of claim 3, wherein the first and second redox couples comprise V ions.

5. The redox battery of claim 1, wherein the redox battery is configured such that the first and second electrolytes self-circulate within respective one of the first and second half cells without being aided by a liquid circulating device.

6. The redox battery of claim 1, wherein the pressure relief conduit has a volume that is between 0.001% and 10% of a total volume of the first and second electrolytes.

7. The redox battery of claim 1, wherein the pressure relieving structure further comprises one or more openings formed through the ion exchange membrane.

8. The redox battery of claim 7, wherein the one or more openings have a lateral dimension of 10 nm-1 mm.

9. The redox battery of claim 1, wherein the pressure relieving structure further comprises the ion exchange membrane having a porous structure.

10. The redox battery of claim 9, wherein the porous structure has a plurality of pores having a lateral dimension of 1 nm-100 µm.

11. The redox battery of claim 1, wherein the pressure relieving structure further comprises an excess free volume in one or both of the positive and negative electrolyte reservoirs that is not filled with a respective one of the first and second electrolytes.

12. The redox battery of claim 11, wherein the excess free volume is between 0.001% and 50% of a total volume of the first and second electrolytes.

13. The redox battery of claim 1, wherein the pressure relieving structure further comprises the ion exchange membrane having a portion replaced with a buffer volume structure having sidewalls enclosing a buffer volume, wherein each of the sidewalls has a hole formed therethrough.

14. The redox battery of claim 1, wherein the pressure relieving structure further comprises the ion exchange membrane having a portion replaced with an electrical short prevention structure comprising protrusions protruding into the positive electrolyte reservoir and the negative electrolyte reservoir, wherein the electrical short prevention structure has a hole formed therethrough.

15. The redox battery of claim 1, wherein one or both of the positive electrolyte reservoir and the negative electrolyte reservoir are formed of a flexible material configured to elastically expand in response to the pressure buildup.

16. The redox battery of claim 1, wherein the pressure relieving structure is configured to reduce or at least partly prevent the pressure buildup by reducing a gas buildup on one or both of the positive and negative electrolyte reservoirs.

17. The redox battery of claim 16, wherein the pressure relieving structure further comprises a gas-reducing layer formed in one or both of the first and second half cells.

18. The redox battery of claim 17, wherein the gas-reducing layer is configured to selectively reduce hydrogen gas.

19. The redox battery of claim 18, wherein the gas-reducing layer comprises platinum (Pt).

20. The redox battery of claim 16, wherein the pressure relieving structure further comprises a gas relief valve configured to selectively release gas therethrough to outside of the first or second half cells while preventing liquid from being released therethrough.

21. The redox battery of claim 1, comprising a plurality of redox battery cells each comprising the first half cell, the second half cell and the ion exchange membrane, wherein the redox battery cells are electrically connected to each other.

22. The redox battery of claim 21, wherein the redox battery cells are stacked.

23. The redox battery of claim 21, wherein the redox battery cells are configured as a plurality of concentric cylindrical shells stacked in a radial direction.

24. The redox battery of claim 1, wherein the positive electrode does not participate in the first redox half reaction, and wherein the negative electrode does not participate in the second redox half reaction.

25. The redox battery of claim 1, wherein in one or both of the positive electrolyte and the negative electrolyte has a thickness in a direction normal to a surface of the ionic membrane that does not exceed 20 cm.

26. The redox battery of claim 1, wherein at least a portion of one or both of the positive electrolyte reservoir and the negative electrolyte reservoir is formed of a flexible material configured to elastically expand, wherein the flexible material is selected from the group consisting of polyvinyl chloride (PVC), polyethylene (PE), polystyrene (PS), polypropylene (PP), polycarbonate (PC) and acrylonitrile butadiene styrene (ABS).

* * * * *

UNITED STATES PATENT AND TRADEMARK OFFICE
CERTIFICATE OF CORRECTION

| | | |
|---|---|---|
| PATENT NO. | : 11,380,928 B2 | Page 1 of 1 |
| APPLICATION NO. | : 17/114910 | |
| DATED | : July 5, 2022 | |
| INVENTOR(S) | : Dongyoung Lee | |

It is certified that error appears in the above-identified patent and that said Letters Patent is hereby corrected as shown below:

On the Title Page

Page 2, Column 2 (Other Publications), Line 15, delete "Nanyanq" and insert -- Nanyang --.

In the Specification

Column 6, Line 50, delete "competiveness" and insert -- competitiveness --.

Column 11, Line 37, delete "Nation®," and insert -- Nafion®, --.

Column 14, Line 44, delete "LIB" and insert -- LIB, --.

Column 15, Line 22, After "e.g.," insert -- $H^+$ --.

Column 17, Line 54, delete "106A" and insert -- 106A, --.

In the Claims

Column 23, Line 51, Claim 1, delete "con figured" and insert -- configured --.

Column 24, Line 11, Claim 8, delete "nm-1 mm." and insert -- nm - 1 mm. --.

Column 24, Line 17, Claim 10, delete "nm-100 μm." and insert -- nm - 100 μm. --.

Signed and Sealed this
Twenty-eighth Day of February, 2023

*Katherine Kelly Vidal*

Katherine Kelly Vidal
*Director of the United States Patent and Trademark Office*